(12) United States Patent
Drago et al.

(10) Patent No.: US 6,832,402 B1
(45) Date of Patent: Dec. 21, 2004

(54) TIRE CHANGING KIT

(76) Inventors: Rosario G. Drago, 141 Calvert Ave., West Babylon, NY (US) 11704; Calogero A. Drago, 141 Calvert Ave., West Babylon, NY (US) 11704

( * ) Notice: Subject to any disclaimer, the term of this patent is extended or adjusted under 35 U.S.C. 154(b) by 0 days.

(21) Appl. No.: 10/628,121

(22) Filed: Jul. 28, 2003

(51) Int. Cl.$^7$ .................................................. B25F 1/00
(52) U.S. Cl. .......................... 7/100; 254/423; 254/93 H; 254/89 H; 254/93 VA
(58) Field of Search .............................. 254/423, 93 R, 254/93 H, 45, 89 H, 93 VA, 418; 280/766.1; 7/100

(56) References Cited

U.S. PATENT DOCUMENTS

| | | | |
|---|---|---|---|
| 4,113,274 A | * | 9/1978 | Vahrenkamp ............... 280/475 |
| 4,174,094 A | * | 11/1979 | Valdespino et al. ......... 254/423 |
| 4,706,937 A | * | 11/1987 | Chung ...................... 254/93 H |
| 4,993,688 A | * | 2/1991 | Mueller et al. ............. 254/423 |
| 5,232,206 A | * | 8/1993 | Hunt et al. ................. 254/423 |
| 5,441,237 A | * | 8/1995 | Sweeney ................ 254/93 HP |
| 5,486,139 A | * | 1/1996 | Papp .......................... 454/123 |
| 5,518,032 A | * | 5/1996 | Berke ....................... 137/899.4 |
| 5,722,641 A | * | 3/1998 | Martin et al. ............... 254/423 |
| 5,765,810 A | * | 6/1998 | Mattera ...................... 254/423 |
| 6,430,772 B1 | * | 8/2002 | Stricklin ...................... 15/323 |
| 2003/0039557 A1 | * | 2/2003 | Burford et al. ............. 417/234 |

* cited by examiner

Primary Examiner—Debra S. Meislin

(57) ABSTRACT

A tire changing kit for quickly changing tires on a vehicle. The tire changing kit includes a power supply being adapted to be disposed in a vehicle and including a motor having a rotatable shaft and being adapted to be connected with wires to a power source of the vehicle and also including hoses; and also includes a jack being detachably connected to one of the hoses for raising and lowering the vehicle; and further includes an assembly of removing lugs from a tire of the vehicle including an air gun being connected to another one of the hoses.

6 Claims, 3 Drawing Sheets

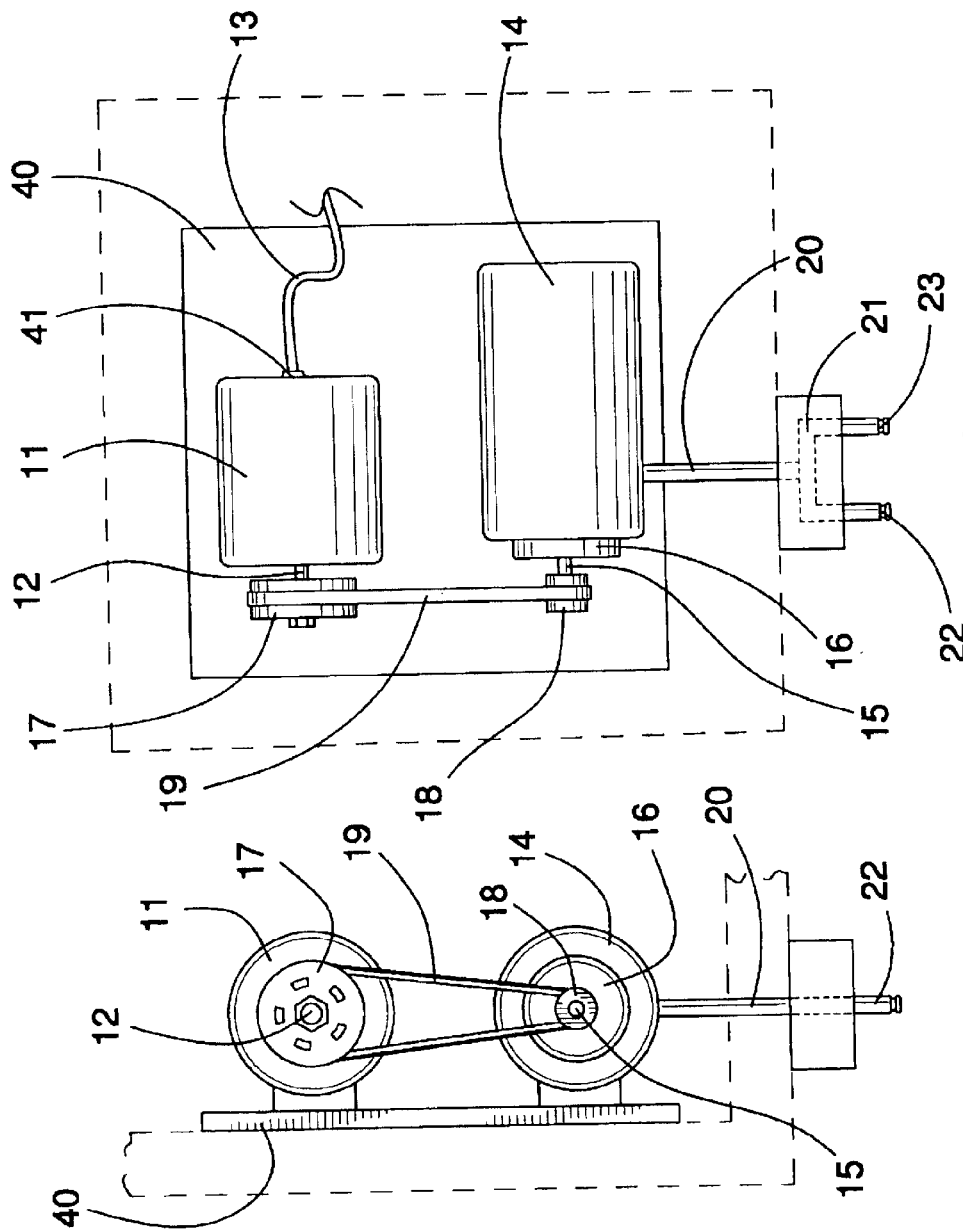

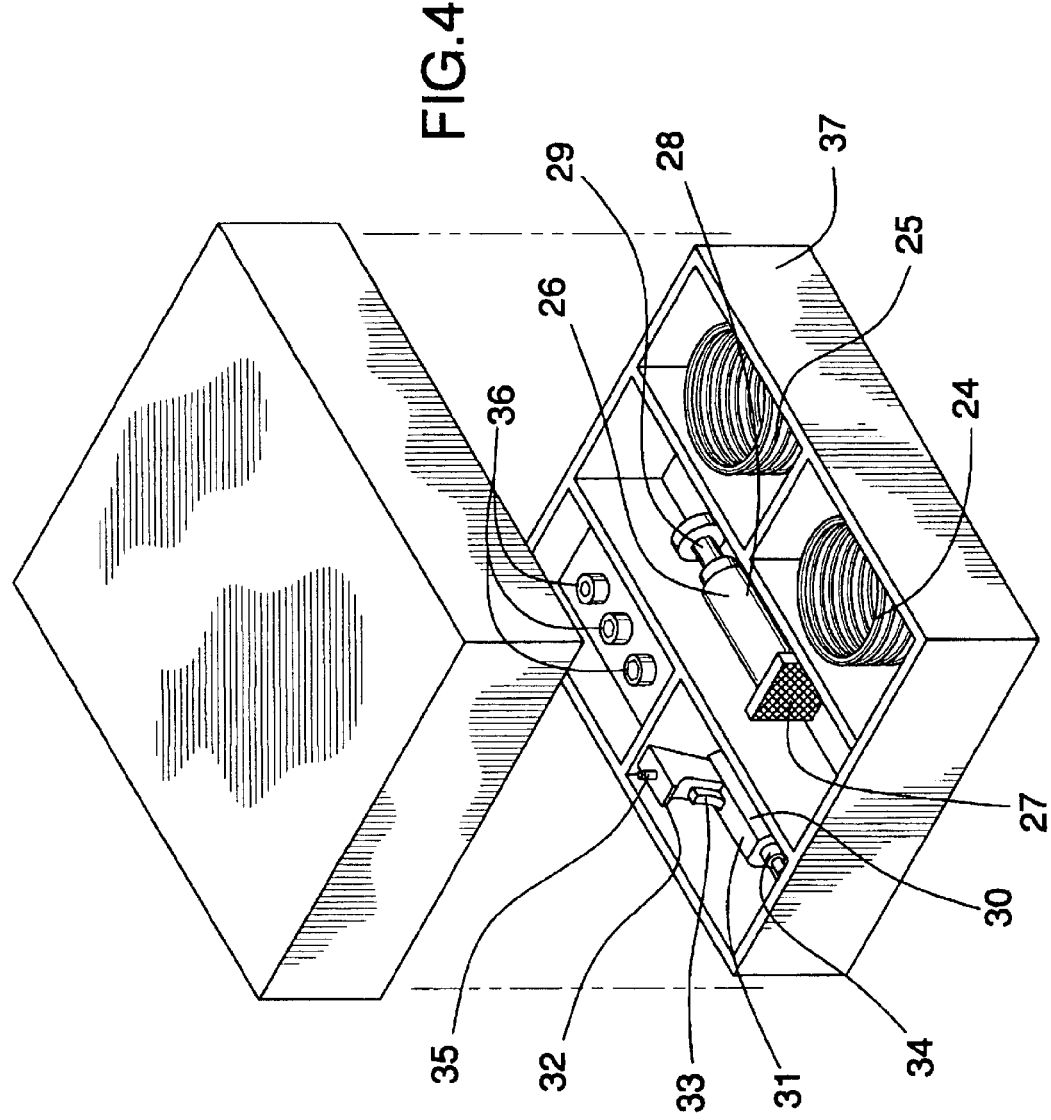

TIRE CHANGING KIT

BACKGROUND OF THE INVENTION

1. Field of the Invention

The present invention relates to tire changing kits and more particularly pertains to a new tire changing kit for quickly changing tires on a vehicle.

2. Description of the Prior Art

The use of tire changing kits is known in the prior art. More specifically, tire changing kits heretofore devised and utilized are known to consist basically of familiar, expected and obvious structural configurations, notwithstanding the myriad of designs encompassed by the crowded prior art which have been developed for the fulfillment of countless objectives and requirements.

The prior art includes jacks and air guns for raising and lowering the jacks with the air guns being attached with hoses to an air compressor disposed in a vehicle. While these devices fulfill their respective, particular objectives and requirements, the aforementioned prior art do not disclose a new tire changing kit.

SUMMARY OF THE INVENTION

The general purpose of the present invention, which will be described subsequently in greater detail, is to provide a new tire changing kit which has many of the advantages of the tire changing kits mentioned heretofore and many novel features that result in a new tire changing kit which is not anticipated, rendered obvious, suggested, or even implied by any of the prior art tire changing kits, either alone or in any combination thereof. The present invention includes a power supply being adapted to be disposed in a vehicle and including a motor having a rotatable shaft and being adapted to be connected with wires to a power source of the vehicle and also including hoses; and also includes a jack being detachably connected to one of the hoses for raising and lowering the vehicle; and further includes an assembly of removing lugs from a tire of the vehicle including an air gun being connected to another one of the hoses. None of the prior art includes the combination of elements of the present invention.

There has thus been outlined, rather broadly, the more important features of the tire changing kit in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new tire changing kit which has many of the advantages of the tire changing kits mentioned heretofore and many novel features that result in a new tire changing kit which is not anticipated, rendered obvious, suggested, or even implied by any of the prior art tire changing kits, either alone or in any combination thereof.

Still another object of the present invention is to provide a new tire changing kit for quickly changing tires on a vehicle.

Still yet another object of the present invention is to provide a new tire changing kit that is easy and convenient to use.

Even still another object of the present invention is to provide a new tire changing kit that allows the less fortunate people to be able to change the tires on one's vehicle without injuring oneself and without having to jack up one's vehicle manually.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a detailed side elevational view of the motor, air compressor, and hose connectors of the present invention.

FIG. 3 is a detailed front elevational view of the motor, air compressor, and hose connectors of the present invention.

FIG. 4 is a perspective view of the carrying case, air gun, sockets, jack, and hoses of the present invention.

DESCRIPTION OF THE PREFERRED EMBODIMENT

Figure 1:
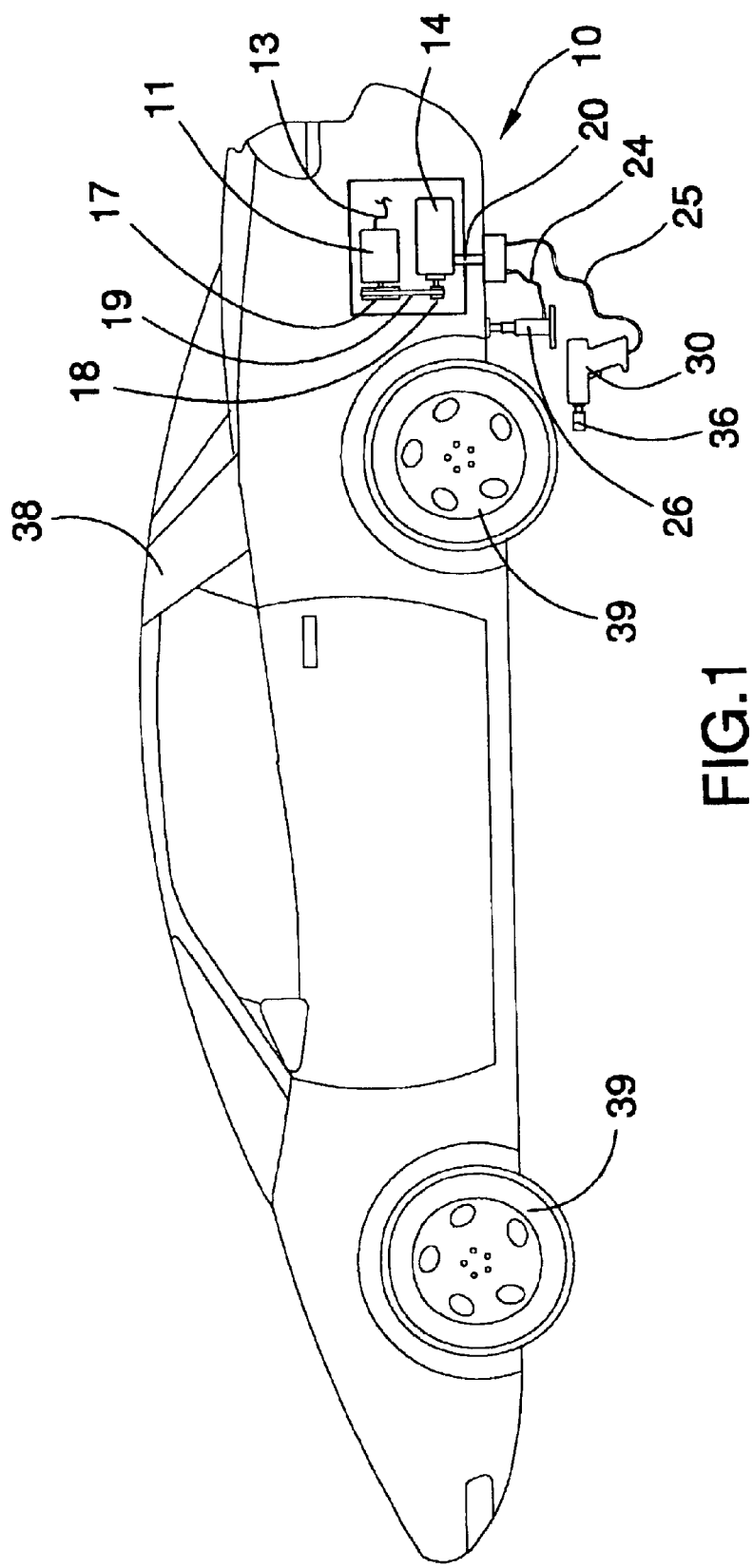
FIG. 1 is a side elevational view of a new tire changing kit according to the present invention.

With reference now to the drawings, and in particular to FIGS. 1 through 4 thereof, a new tire changing kit embodying the principles and concepts of the present invention and generally designated by the reference numeral 10 will be described.

As best illustrated in FIGS. 1 through 4, the tire changing kit 10 generally comprises a power supply being adapted to be disposed in a vehicle 38 and including a mounting bracket 40 being adapted to be securely mounted in the vehicle 38, and also including a motor 11 being securely and conventionally attached to the mounting bracket 40 and having a rotatable shaft 12 and an on/off switch and being adapted to be connected with wires 13 to a power source of the vehicle 38, and also including hoses 24,25. The power supply also includes an air compressor unit 14–16 being adapted to be securely and conventionally mounted to the mounting bracket 40 and being energized by the motor 111 and having an air tank 14, a rotatable shaft 15, and a compressor 16 for creating pressurized air in the air tank 14, and further includes a first pulley 17 being conventionally mounted to the rotatable shaft 12 of the motor 11, and also includes a second pulley 18 being conventionally mounted to the rotatable shaft 15 of the air compressor unit 14–16, and further includes an endless belt 19 being carried by the first and second pulleys 17,18, and also includes an air conduit 20 being conventionally connected to the air tank 14, and further includes hose connectors 22,23 being conventionally attached to the air conduit 20. The air conduit 20 has a fork-shaped end portion 21. The hose connectors 22,23 are generally ribbed nozzles which are removably engaged in open ends of the hoses 24,25.

A jack 26 is detachably connected to one of the hoses 24 for raising and lowering the vehicle 38. The jack 26 includes a support member 27 for resting upon a surface, and also includes a tubular base member 28 being conventionally mounted upon the support member 27, and further includes a shaft 29 being movably and conventionally disposed in and extended from the tubular base member 28 for raising and lowering the vehicle 38.

A means of removing lugs from a tire 39 of the vehicle 38 includes an air gun 30 being connected to another one of the hoses 25. The air gun 30 includes a barrel 31, a handle 32, a stub shaft 34 being rotatably disposed in an end of the barrel 31, a trigger 33 for energizing the stub shaft 34, and a hose connecting member 35 for connecting to the hose 25. The means of removing lug nuts from a tire 39 of the vehicle 38 also includes socket members 36 being removably and conventionally attached to the stub shaft 34 for rotation therewith and being adapted to engagably receive the lug nuts of the tire 39. The jack 26, the air gun 30, the socket members 36, and the hoses 24,25 are conveniently stored in a carrying case 37 having a plurality of storage compartments being separated by partitions.

In use, the user turns on the motor 11 using the on/off switch 41 which causes the air tank 14 to fill with pressurized air. The pressurized air is used to energize the jack 26 for raising the vehicle 38 and also used to energize the air gun 30 so that the lug nuts on the tire 39 can be easily removed to change the tire 39 from the vehicle 38. The air gun 30 is also used to fasten the lug nuts to a replacement tire being mounted to the vehicle 38.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the tire changing kit. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A tire changing kit comprising:
   a power supply being adapted to be disposed in a vehicle and including a mounting bracket being adapted to be securely disposed in the vehicle and also including a motor being securely mounted to said mounting bracket and having a rotatable shaft and an on/off switch and being adapted to be connected with wires to a power source of the vehicle, and also including hoses, said power supply also including an air compressor unit being securely mounted to said mounting bracket and being energized by said motor and having an air tank, a rotatable shaft, and a compressor for creating pressurized air in said air tank, and further including a first pulley being mounted to said rotatable shaft of said motor, and also including a second pulley being mounted to said rotatable shaft of said air compressor unit, and further including an endless belt being carried by said first and second pulleys, and also including an air conduit being connected to said air tank, and further including hose connectors being attached to said air conduit;
   a jack being detachably connected to one of said hoses for raising and lowering the vehicle; and
   a means of removing lugs from a tire of the vehicle including an air gun being connected to another one of said hoses.

2. A tire changing kit as described in claim 1, wherein said air conduit has a fork-shaped end portion.

3. A tire changing kit as described in claim 2, wherein said hose connectors are generally ribbed nozzles which are removably engaged in open ends of said hoses.

4. A tire changing kit as described in claim 1, wherein said jack includes a support member for resting upon a surface, and also includes a tubular base member being mounted upon said support member, and further includes a shaft being movably disposed in and extended from said tubular base member for raising and lowering the vehicle.

5. A tire changing kit as described in claim 1, wherein said air gun includes a barrel, a handle, a stub shaft rotatably disposed in an end of said barrel, a trigger for energizing said stub shaft, and a hose connecting member for connecting to said hose.

6. A tire changing kit as described in claim 5, wherein said means of removing lug nuts from a tire of the vehicle also includes socket members being removably attached to said stub shaft for rotation therewith and being adapted to engagably receive the lug nuts of the vehicle.

* * * * *